US 9,843,351 B2

(12) United States Patent
Arrasvuori et al.

(10) Patent No.: US 9,843,351 B2
(45) Date of Patent: Dec. 12, 2017

(54) GESTURE ACTIVATED CLOSE-PROXIMITY COMMUNICATION

(75) Inventors: Juha Henrik Arrasvuori, Tampere (FI); Petri Matti Olavi Piippo, Lampaala (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 3234 days.

(21) Appl. No.: 11/828,820

(22) Filed: Jul. 26, 2007

(65) Prior Publication Data

US 2009/0031258 A1 Jan. 29, 2009

(51) Int. Cl.
| | |
|---|---|
| *H04B 1/3827* | (2015.01) |
| *G06F 3/0488* | (2013.01) |
| *G06F 3/01* | (2006.01) |
| *H04M 1/725* | (2006.01) |
| *H04W 4/20* | (2009.01) |
| *H04W 4/00* | (2009.01) |
| *H04W 4/02* | (2009.01) |

(52) U.S. Cl.
CPC ............ *H04B 1/3833* (2013.01); *G06F 3/017* (2013.01); *G06F 3/0488* (2013.01); *G06F 3/04883* (2013.01); *H04M 1/72563* (2013.01); *H04W 4/023* (2013.01); *H04W 4/206* (2013.01); *H04M 2250/12* (2013.01); *H04W 4/001* (2013.01); *H04W 4/02* (2013.01); *H04W 4/026* (2013.01)

(58) Field of Classification Search
CPC .... G06F 3/017; G06F 3/0488; G06F 3/04883; G06F 3/04886; G06F 3/0482
USPC ................................. 715/863, 733
See application file for complete search history.

(56) References Cited

U.S. PATENT DOCUMENTS

| | | | |
|---|---|---|---|
| 6,672,961 B1 | 1/2004 | Uzun | |
| 7,024,228 B2 | 4/2006 | Komsi et al. | |
| 7,145,454 B2 | 12/2006 | Linjama et al. | |
| 7,452,268 B2 | 11/2008 | Annunziata | |
| 2002/0198003 A1* | 12/2002 | Klapman | 455/456 |
| 2003/0224856 A1 | 12/2003 | Bukovsky et al. | |
| 2004/0029625 A1 | 2/2004 | Annunziata | |

(Continued)

FOREIGN PATENT DOCUMENTS

| | | |
|---|---|---|
| EP | 1104143 A2 | 5/2001 |
| WO | 2005076114 A1 | 8/2005 |

OTHER PUBLICATIONS

International Search Report cited in PCT/IB2008/052294 dated Jan. 20, 2009.

(Continued)

*Primary Examiner* — Tuyetlien T Tran
(74) *Attorney, Agent, or Firm* — Ditthavong & Steiner, P.C.

(57) ABSTRACT

A system for establishing a link from a wireless communication device (WCD) to at least one target device that is a member of a particular user group. The process of both locating the target device and establishing a link may incorporate the orientation and/or movement of the WCD into the procedure in lieu of the extensive use of traditional menu interfaces. For example, a WCD may recognize a combination of orientation and/or movement changes as a pattern for triggering activities, such as scanning for other devices. Various movement patterns may also be employed to establish a wireless link and for further interaction between users/devices in a user group.

29 Claims, 14 Drawing Sheets

EXAMPLE MOVEMENTS OF DEVICE BY USER IN ORDER
TO INITIATE SCANNING AND/OR COMMUNICATION

Example 1 - use of directional and/or motion sensors in "Z" motion:

Example 2 - use of orientation and/or motion and/or directional sensors by "flipping"

(56) References Cited

U.S. PATENT DOCUMENTS

| | | |
|---|---|---|
| 2004/0030787 A1 | 2/2004 | Jandel et al. |
| 2004/0075677 A1 | 4/2004 | Loyall et al. |
| 2005/0210419 A1 | 9/2005 | Kela et al. |
| 2005/0212758 A1 | 9/2005 | Marvit et al. |
| 2006/0052109 A1* | 3/2006 | Ashman et al. .............. 455/440 |
| 2006/0256082 A1 | 11/2006 | Cho et al. |
| 2007/0026869 A1 | 2/2007 | Dunko |
| 2007/0273583 A1* | 11/2007 | Rosenberg ................... 342/367 |
| 2007/0298866 A1 | 12/2007 | Gaudiano et al. |
| 2008/0120113 A1 | 5/2008 | Loyall et al. |
| 2008/0170776 A1* | 7/2008 | Albertson et al. ............ 382/154 |
| 2009/0044113 A1 | 2/2009 | Jones et al. |
| 2009/0150778 A1 | 6/2009 | Nicol, II |

OTHER PUBLICATIONS

Office Action for related US Appl. No. 12/080,520 dated Mar. 31, 2011, pp. 1-17.

Korean Office Action for corresponding KR Application No. 2010-7004361 dated May 12, 2011, pp. 1-8.

Korean Office Action for related Korean Application No. 2010-7004361 dated Mar. 13, 2012, pp. 1-4.

Korean Office Action for related Korean Application No. 2010-702474 dated Mar. 9, 2012, pp. 1-12.

Office Action for related Chinese Patent Application No. 200880025621.8 dated Jan. 29, 2013, pp. 1-6.

Korean Office Action for related Korean Patent Application No. 2010-7004361 dated Jan. 2, 2012, pp. 1-7.

Office Action for related Chinese Patent Application No. 200880025621.8 dated Jul. 20, 2012, pp. 1-42.

Office Action for related U.S. Appl. No. 12/080,520 dated Dec. 17, 2012, pp. 1-24.

Notification of the First Office Action, Chinese Application No. 200980111026.0, dated May 28, 2012.

Office Action for corresponding Indian Patent Application No. 724/CHENP/2010, dated Mar. 14, 2016, 3 Pages.

* cited by examiner

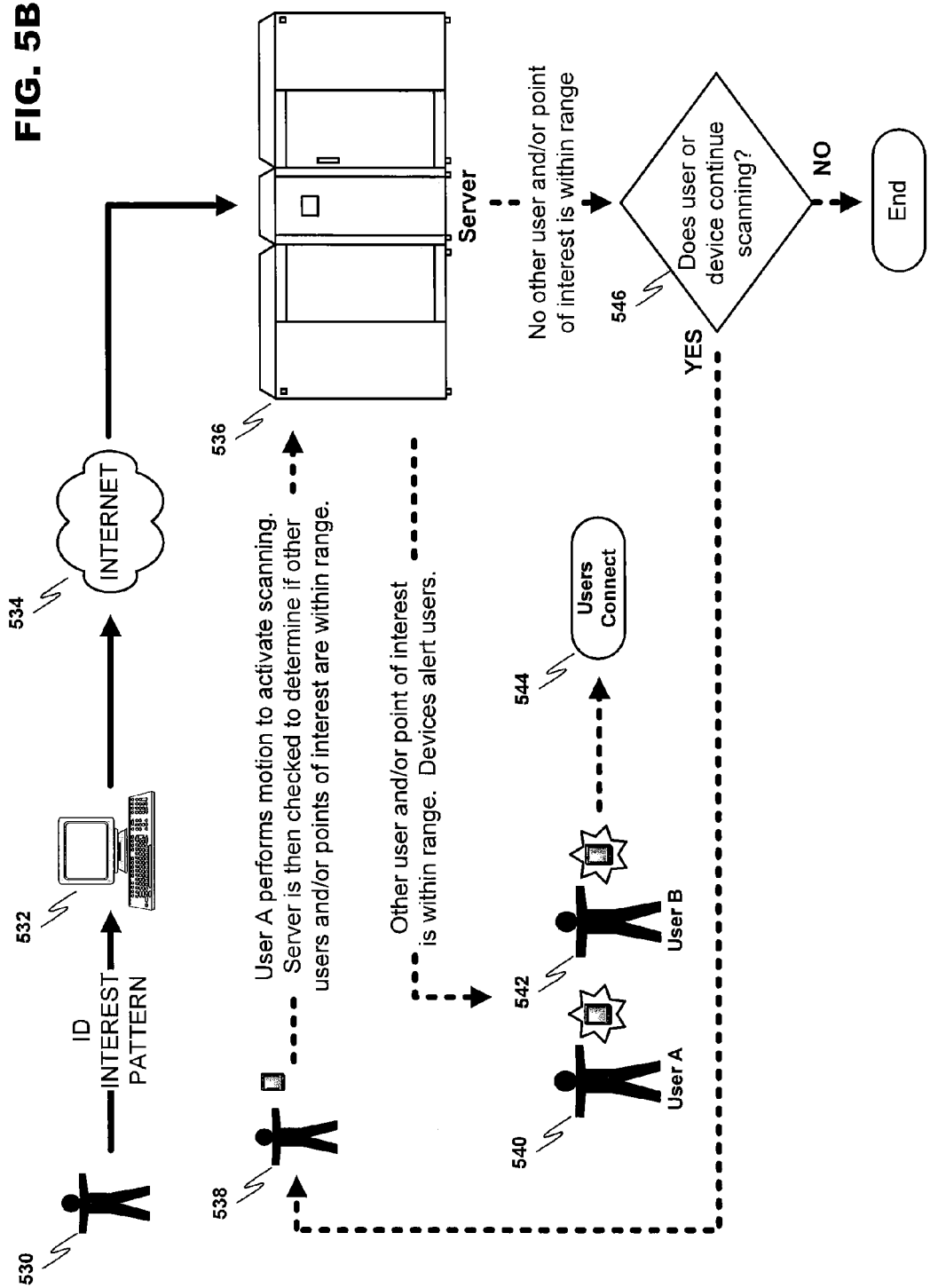

FIG. 6
EXAMPLE MOVEMENTS OF DEVICE BY USER IN ORDER
TO INITIATE SCANNING AND/OR COMMUNICATION
Example 1 - use of directional and/or motion sensors in "Z" motion:
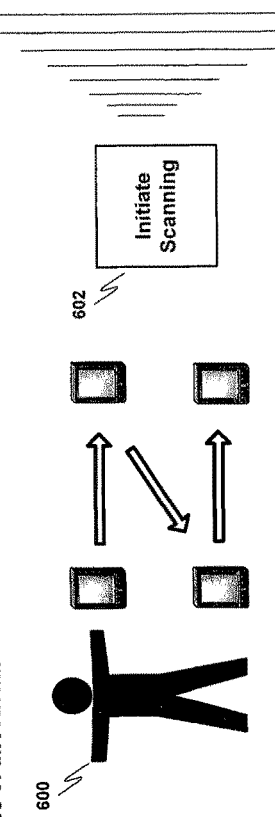
Example 2 - use of orientation and/or motion and/or directional sensors by "flipping"
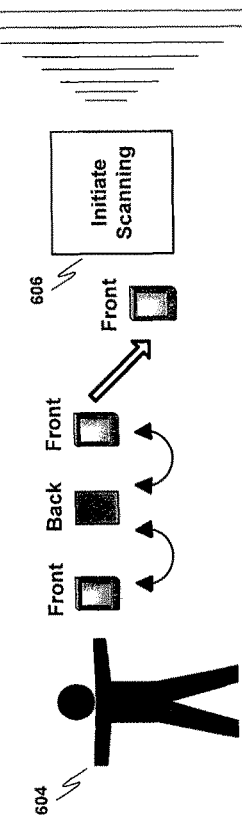

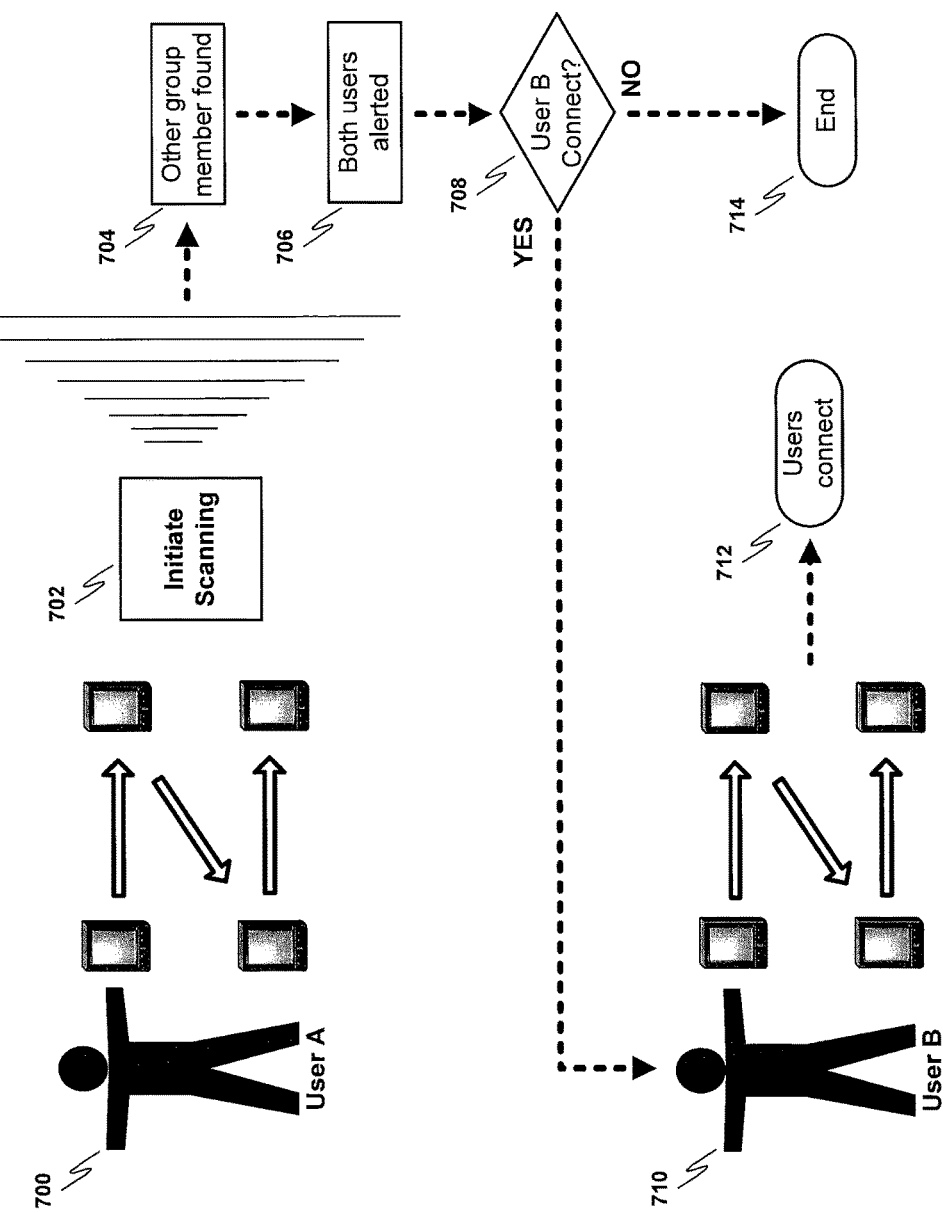

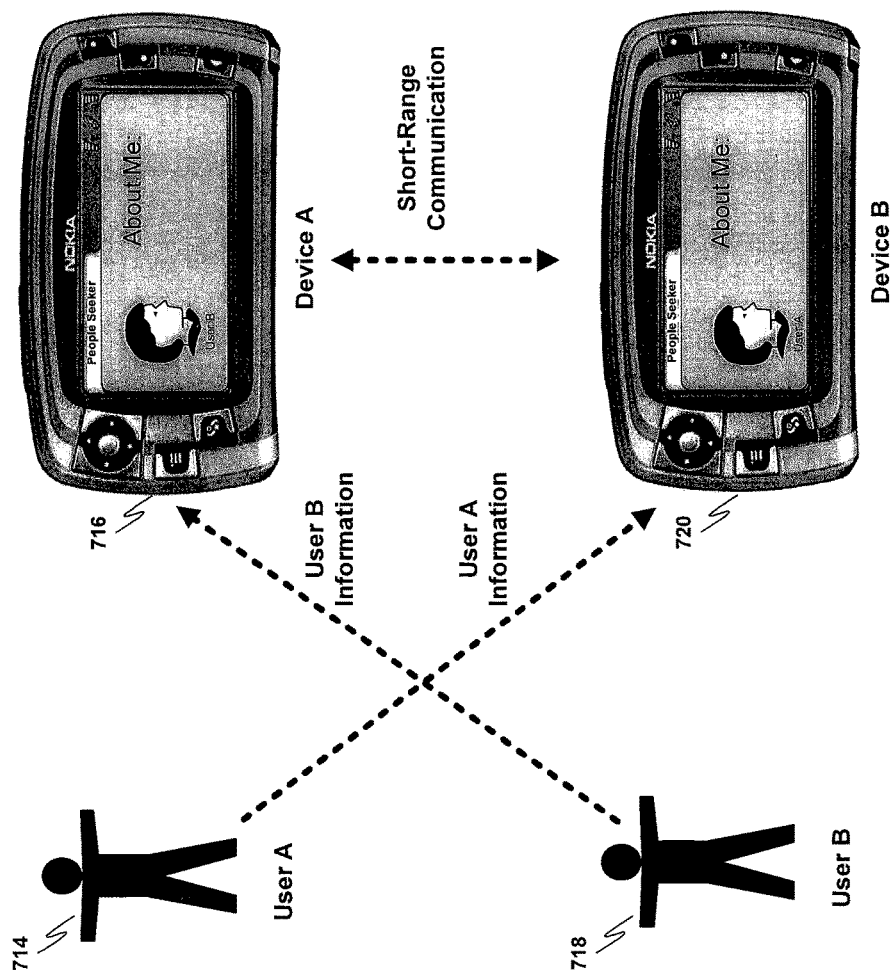

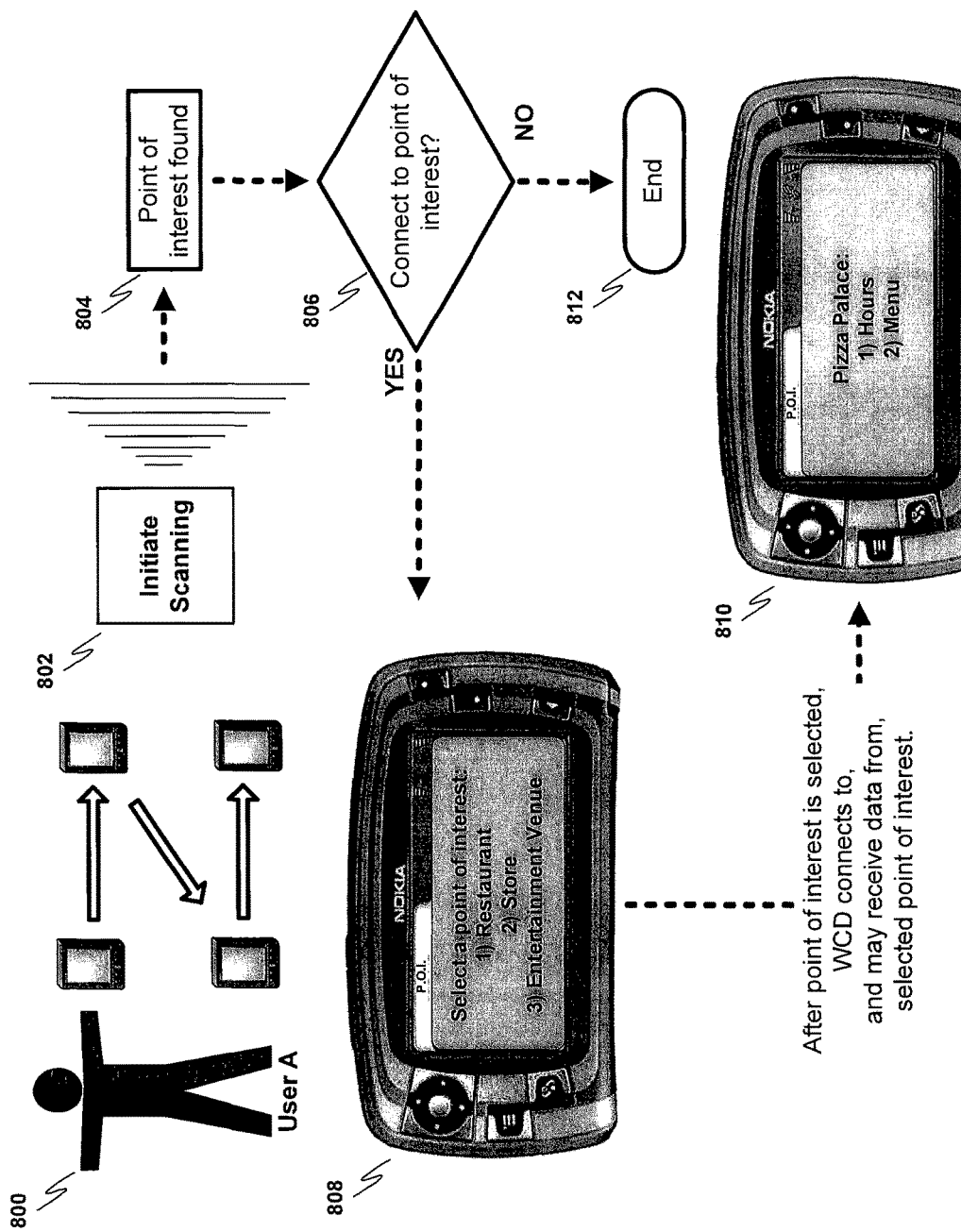

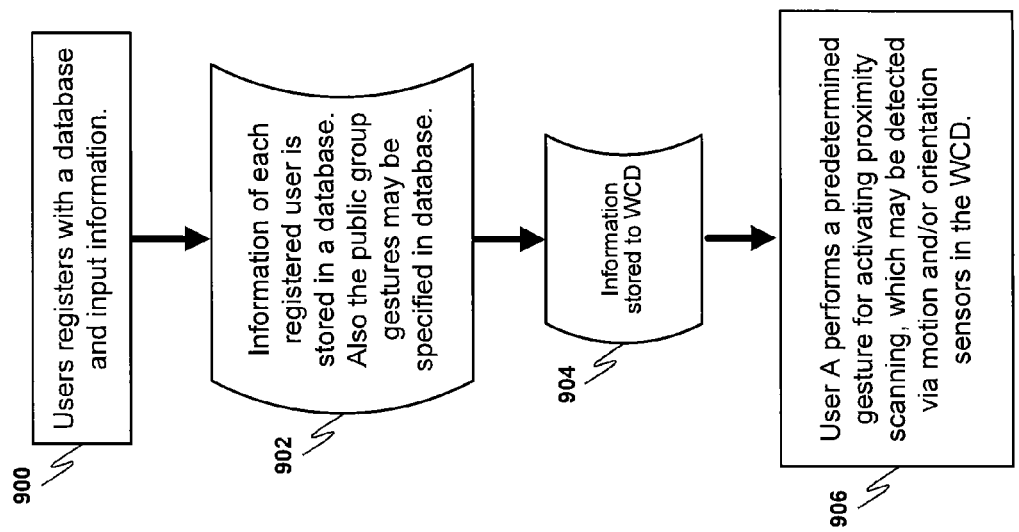

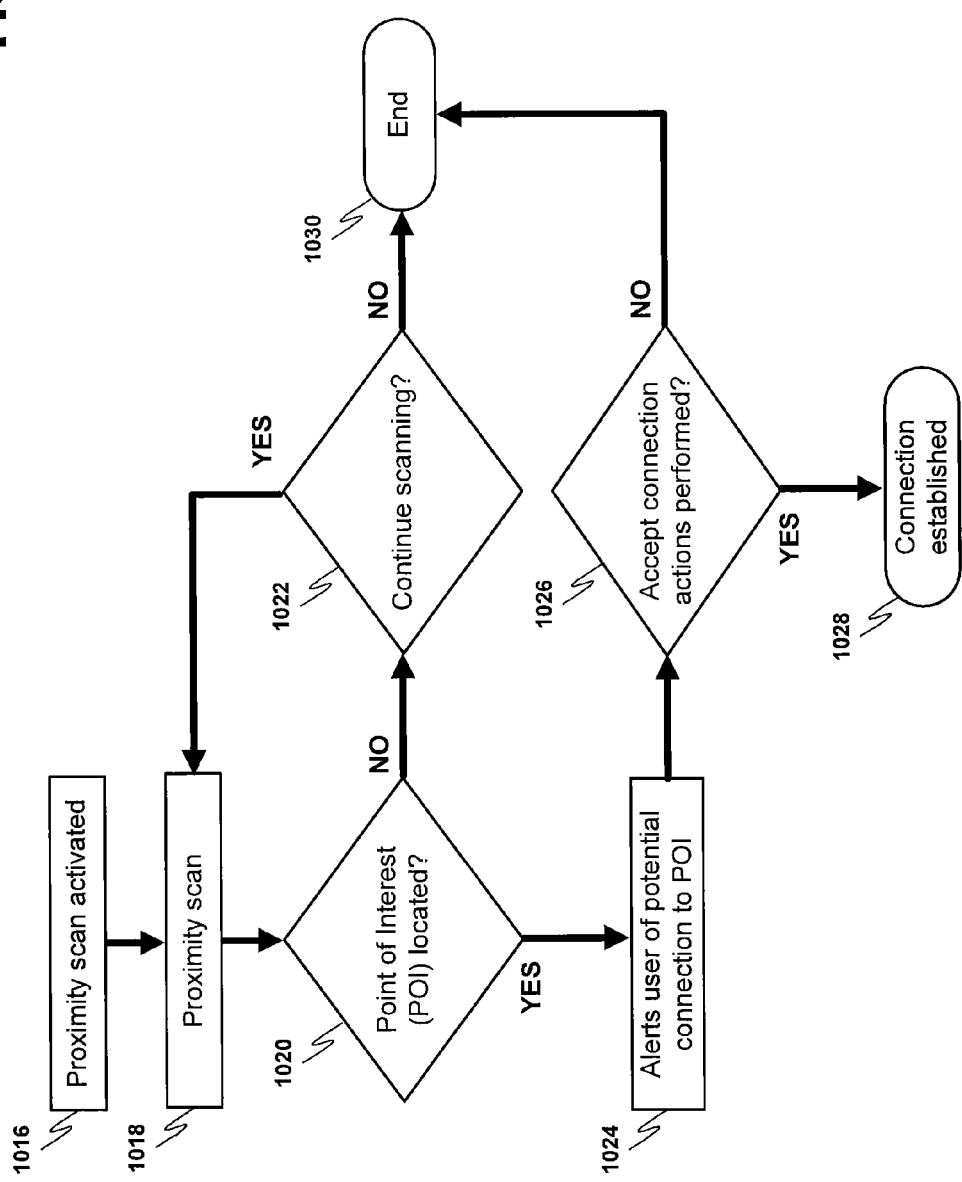

GESTURE ACTIVATED CLOSE-PROXIMITY COMMUNICATION

BACKGROUND

1. Field of Invention

The present invention relates to a system for facilitating wireless communication, and more specifically, to a system for controlling a wireless communication device in instigating or accepting a wireless connection based on gesture and/or orientation recognition in the device.

2. Background

Modern society has quickly adopted, and become reliant upon, handheld devices for wireless communication. For example, cellular telephones continue to proliferate in the global marketplace due to technological improvements in both the quality of the communication and the functionality of the devices. These wireless communication devices (WCDs) have become commonplace for both personal and business use, allowing users to transmit and receive voice, text and graphical data from a multitude of geographic locations. The communication networks utilized by these devices may span different frequencies and cover different transmission distances, each having characteristics desirable for various applications.

Cellular networks facilitate WCD communication over large geographic areas. These network technologies have commonly been divided by generations, starting in the late 1970s to early 1980s with first generation (1G) analog cellular telephones that provided baseline voice communication, to modern digital cellular telephones. GSM is an example of a widely employed 2G digital cellular network communicating in the 900 MHz/1.8 GHz bands in Europe and at 850 MHz and 1.9 GHz in the United States. This network provides voice communication and also supports the transmission of textual data via the Short Messaging Service (SMS). SMS allows a WCD to transmit and receive text messages of up to 160 characters, while providing data transfer to packet networks, ISDN and POTS users at 9.6 Kbps. The Multimedia Messaging Service (MMS), an enhanced messaging system allowing for the transmission of sound, graphics and video files in addition to simple text, has also become available in certain devices. Soon emerging technologies such as Digital Video Broadcasting for Handheld Devices (DVB-H) will make streaming digital video, and other similar content, available via direct transmission to a WCD. While long-range communication networks like GSM are a well-accepted means for transmitting and receiving data, due to cost, traffic and legislative concerns, these networks may not be appropriate for all data applications.

Short-range wireless networks provide communication solutions that avoid some of the problems seen in large cellular networks. Bluetooth™ is an example of a short-range wireless technology quickly gaining acceptance in the marketplace. A 1 Mbps Bluetooth™ radio may transmit and receive data at a rate of 720 Kbps within a range of 10 meters, and may transmit up to 100 meters with additional power boosting. Emerging enhanced data rate (EDR) may further enable maximum asymmetric data rates of 1448 Kbps for a 2 Mbps connection and 2178 Kbps for a 3 Mbps connection. A user does not actively instigate a Bluetooth™ network. Instead, a plurality of devices within operating range of each other may automatically form a network group called a "piconet". Any device may promote itself to the master of the piconet, allowing it to control data exchanges with up to seven "active" slaves and 255 "parked" slaves. Active slaves exchange data based on the clock timing of the master. Parked slaves monitor a beacon signal in order to stay synchronized with the master. These devices continually switch between various active communication and power saving modes in order to transmit data to other piconet members. In addition to Bluetooth™ other popular short-range wireless network technologies include WLAN (of which "Wi-Fi" local access points communicating in accordance with the IEEE 802.11 standard, is an example), Wireless USB (WUSB), Ultra Wideband (UWB), ZigBee (802.15.4, 802.15.4a), and UHF RFID. All of these wireless communication technologies have features and advantages that make them appropriate for various applications.

More recently, manufacturers have also begun to incorporate various resources for providing enhanced functionality in WCDs (e.g., components and software for performing close-proximity wireless information exchanges). Sensors and/or scanners may be used to read visual or electronic information into a device. A transaction may involve a user holding their WCD in proximity to a target, aiming their WCD at an object (e.g., to take a picture) or sweeping the device over a printed tag or document. Machine-readable technologies such as radio frequency identification (RFID), Infra-red (IR) communication, optical character recognition (OCR) and various other types of visual, electronic and magnetic scanning are used to quickly input desired information into the WCD without the need for manual entry by a user.

The inclusion of additional features, such as those described above, into wireless-enabled devices has enhanced the ability of WCDs to operate in a variety of new applications. However, with improved functionality may also come increased complexity. As multipurpose wireless devices become available to more and more users of various skills levels, these new abilities may both remedy existing issues and cause new problems. More specifically, devices that include additional functionality may also be complicated to control (e.g., additional user participation, such as through traditional menu interaction, may be required to configure and/or implement these features). As a result, the knowledge required for operation may become so unwieldy that these beneficial features may go unused due to a lack of understanding about their operation. These difficulties may be especially egregious in situations where the device is being used simply for social communication and entertainment, as this group of users may only have a rudimentary technological understanding of how to operate various functions in a WCD.

What is therefore needed is a more-intuitive system and/or method for activating various operations within a WCD. A user who may not be technically proficient should be able to initiate various operations on a WCD in a simple manner that may further be derived from aspects of other technologies with which a user may be more proficient due to their daily use.

SUMMARY OF INVENTION

The present invention includes at least a method, device, computer program and system for triggering an event in a WCD through recognition of sensed information. In at least one embodiment of the present invention, sensors incorporated within a device may be utilized to determine the orientation and/or position of a WCD during a series of motions forming a pattern. Certain recognized patterns performed by a user may initiate events within the device, such as activating a scan mode, initiating communication with another device, accepting information etc.

In at least one example of the present invention, an initiating procedure performed by the user on a WCD may utilize orientation and/or direction vectors in order to recognize a pattern. These patterns may be universal or default patterns known to a group, or public patterns, or patterns that are established by a user for exclusive use, also known as private patterns. Public patterns may be set by a group of users, for example, operating via existing or emerging Internet communities. An online community, or user group, may define public patterns recognized by all members of the group. These patterns may be used for social interaction, such as for initiating contact with, or accepting communication from, another member of the user group. On the other hand, personal patterns may be defined locally, for example, on a WCD of a user. Uses for personal patterns may include activating a scan, pairing of devices (e.g., accepting an invitation from another user to communicate), activating an application on a WCD, accepting information for download, etc.

Exemplary embodiments of the present invention may combine various private and/or public patterns to orchestrate different aspects of wireless communication previously available only via traditional menu interfaces. The patterns may not only simplify interaction for a user that is not technically proficient with a particular WCD, but it may also enhance user experience by introducing entertaining aspects of both pattern creation/recognition and online social networking currently available primarily via interactions over the Internet.

DESCRIPTION OF DRAWINGS

The invention will be further understood from the following detailed description of one or more embodiments, taken in conjunction with appended drawings, in which:

FIG. 5B discloses an alternative exemplary communication configuration and initiation strategy in accordance with at least one embodiment of the present invention.

FIG. 6 discloses exemplary patterns usable for initiating scanning and/or confirming a connection in accordance with at least one embodiment of the present invention.

FIG. 7A discloses an exemplary connection establishment between two users in accordance with at least one embodiment of the present invention.

FIG. 7B discloses an exemplary information exchange between two users in accordance with at least one embodiment of the present invention.

FIG. 8 discloses an exemplary connection between a user and a point of interest in accordance with at least one embodiment of the present invention.

FIG. 9A discloses an exemplary flowchart for a process of storing and accessing information in accordance with at least one embodiment of the present invention.

FIG. 10B discloses an exemplary flowchart for a location and discovery process for a point of interest in accordance with at least one embodiment of the present invention.

DESCRIPTION OF EMBODIMENTS

While the invention has been described in one or more embodiments, various changes can be made therein without departing from the spirit and scope of the invention, as described in the appended claims.

I. Wireless Communication Over Different Communication Networks

Figure 1:
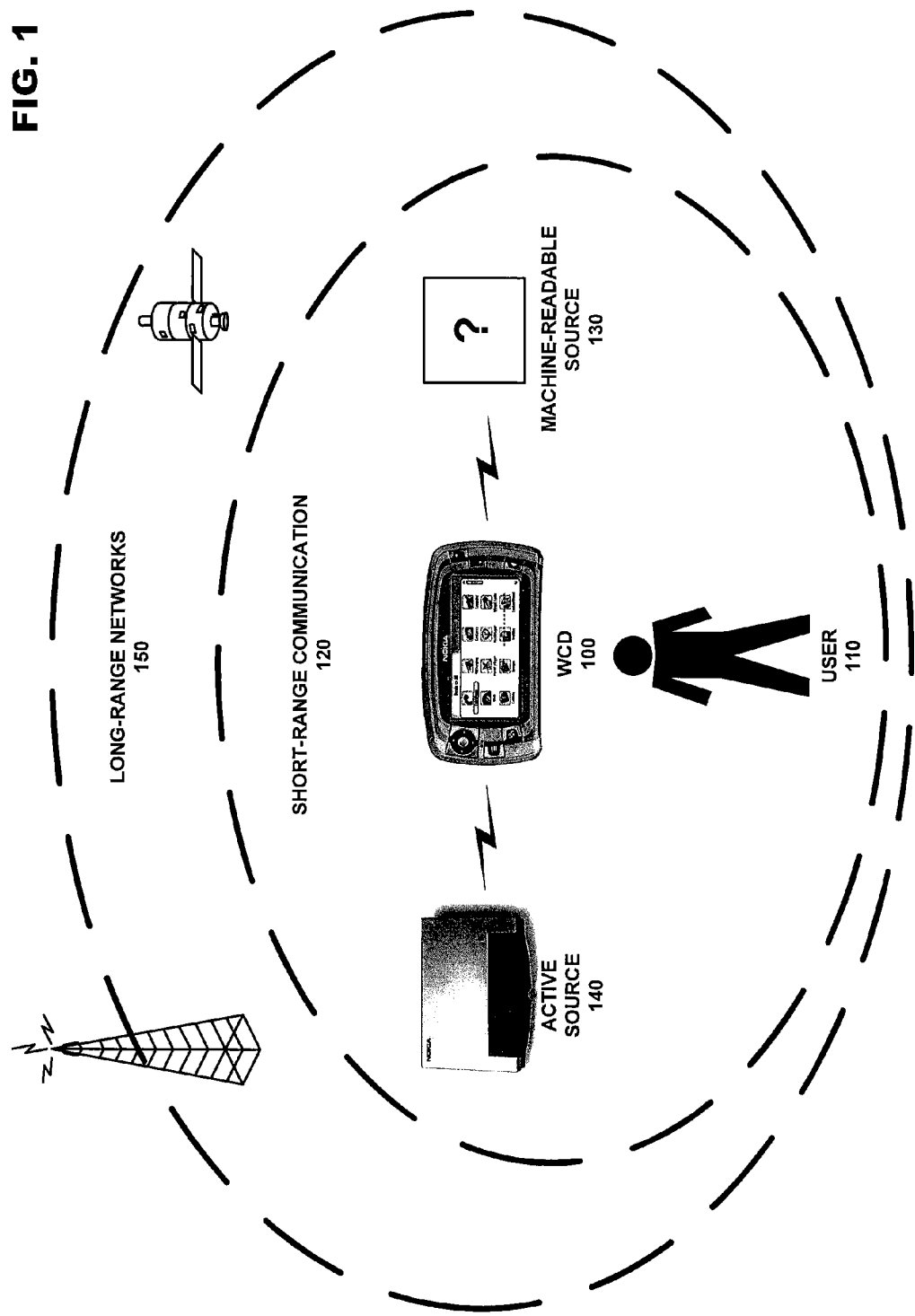
FIG. 1 discloses an exemplary short-range to long-range wireless communication environment usable to describe at least one embodiment of the present invention.

A WCD may both transmit and receive information over a wide array of wireless communication networks, each with different features regarding speed, range, quality (error correction), security (encoding), etc. These characteristics will dictate the amount of information that may be transferred to a receiving device, and the duration of the information transfer. FIG. 1 includes a diagram of a WCD and how it interacts with various types of wireless networks.

In FIG. 1, wherein at least one embodiment of the invention is described, user 110 possesses an exemplary WCD 100. This device 100 may be, for example, a cellular phone, a mobile communication device, a PDA (Personal Digital Assistant), an audio/video player, a digital camera/camcorder, a positioning device like a GPS device (Global Positioning System), a mobile radio/TV device a wirelessly enabled palmtop or laptop computer, etc., or any combination of the aforementioned. Various types of communication may be supported by WCD 100, including the depicted example classifications of short-range communication 120 and long-range networks 150. Short-range communication 120 may include a multitude of devices communicating over various wireless mediums. These devices and mediums may be selected for certain scenarios based on their characteristics, such as operational range, speed, error correction, complexity of implementation, security, etc. For example, machine-readable sources 130 may include various transponder-type interactions wherein normally only the scanning device requires its own power source. WCD 100 scans source 130 via short-range communication. A transponder in source 130 may use the energy and/or clock signal contained within the scanning signal, as in the case of RFID communication, to respond with data stored in the transponder. These types of technologies usually have an effective transmission range on the order of ten feet, and may be able to deliver stored data in amounts from a bit to over a megabit (or 125 Kbytes) relatively quickly. These features make such technologies well suited for identification purposes, such as to receive and/or transmit information or data such as, personal profiles, personal images, restaurant coupons, location directions, pass codes, passwords, etc.

The transmission range between two devices may be extended if both devices are capable of performing powered communication. For example, short-range active sources 140 may include applications wherein the sending and receiving devices are both active. An exemplary situation would include user 110 coming within effective transmission range of a Bluetooth™, Wireless Local Area Network (WLAN), Ultra Wide Band (UWB), Wireless Universal Serial Bus (WUSB), Infrared Data Association (IrDA), Wibree™, etc. access point. In the case of Bluetooth™, a network may automatically be established to transmit information to WCD 100 possessed by user 110. This data may include information of an informative, educational or entertaining nature. The amount of information to be conveyed is unlimited, except that it may be transferred in the time when user 110 is within effective transmission range of the access point. Due to the higher complexity of these wireless networks, additional time is also required to establish the initial connection to WCD 100, which may be increased if many devices are queued for service in the area proximate to the access point. The effective transmission range of these networks depends on the technology, and may be from some 30 ft. to over 300 ft. with additional power boosting.

Long-range networks 150 may be used to provide virtually uninterrupted communication coverage for WCD 100. Land-based radio stations or satellites may be utilized to relay various communication transactions worldwide. While these systems are extremely functional, the use of these systems is often charged on a per-minute basis to user 110, not including additional charges for data transfer (e.g., wireless Internet access). Further, the regulations covering these systems may cause additional overhead for both the users and providers, making the use of these systems more cumbersome.

II. Wireless Communication Device

As previously described, the present invention may be implemented using a variety of wireless communication equipment. Therefore, it is important to understand the communication tools available to user 110 before exploring the present invention. For example, in the case of a cellular telephone or other handheld wireless devices, the integrated data handling capabilities of the device play an important role in facilitating transactions between the transmitting and receiving devices.

Figure 2:
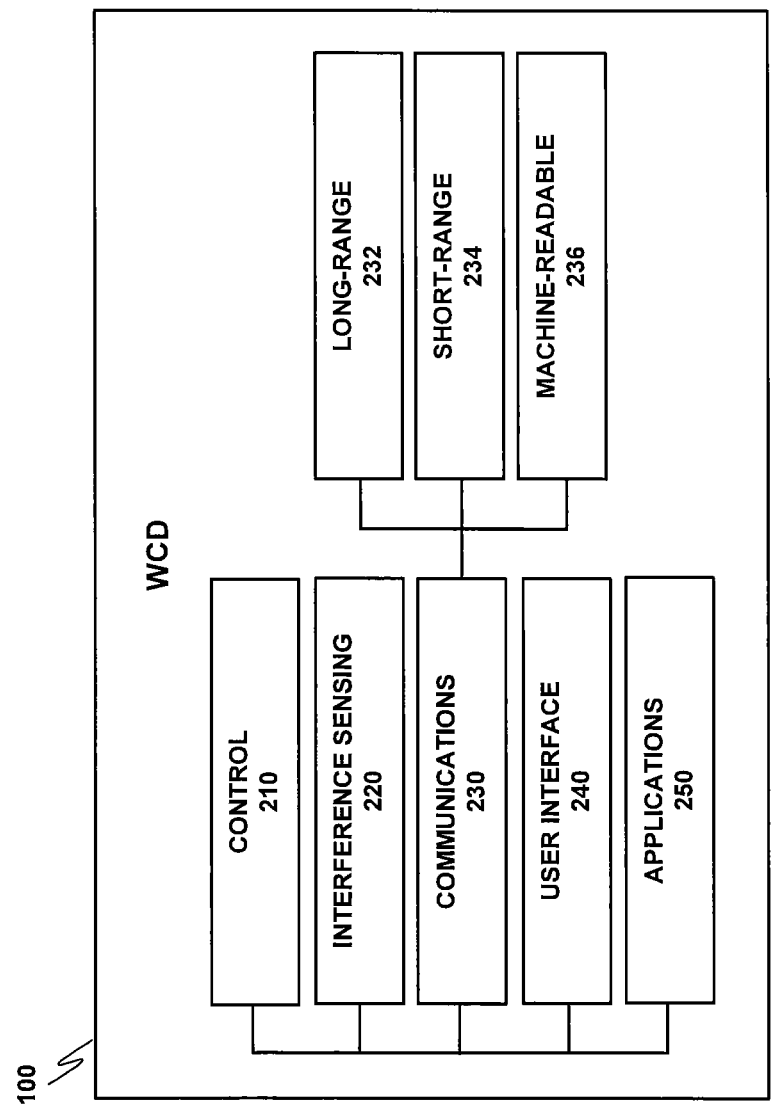
FIG. 2 discloses a modular description of an exemplary wireless communication device usable with at least one embodiment of the present invention.

FIG. 2, in accordance with at least one embodiment of the present invention, discloses an exemplary modular layout for a wireless communication device usable with the present invention. WCD 100 is broken down into modules representing the functional aspects of the device. These functions may be performed by the various combinations of software and/or hardware components discussed below.

Control module 210 regulates the operation of the device. Inputs may be received from various other modules included within WCD 100. For example, interference sensing module 220 may use various techniques known in the art to sense sources of environmental interference within the effective transmission range of the wireless communication device. Control module 210 interprets these data inputs, and in response, may issue control commands to the other modules in WCD 100.

Communications module 230 may incorporate the communications aspects of WCD 100. As shown in FIG. 2, communications module 230 may include, for example, wireless long-range communications module 232, wireless short-range communications module 234 and wireless machine-readable communications module 236. Communications module 230 utilizes at least these sub-modules to receive a multitude of different types of communication from both local and long distance sources, and to transmit data to recipient devices within the transmission range of WCD 100. Communications module 230 may be triggered by control module 210, or by control resources local to the module responding to sensed messages, environmental influences and/or other devices in proximity to WCD 100.

User interface module 240 may include visual, audible and tactile elements which allow the user 110 to receive data from, and enter data into, the device. The data entered by user 110 may be interpreted by control module 210 to affect the behavior of WCD 100. User-inputted data may also be transmitted by communications module 230 to other devices within effective transmission range. Other devices in transmission range may also send information to WCD 100 via communications module 230, and control module 210 may cause this information to be transferred to user interface module 240 for presentment to the user.

Applications module 250 may incorporate all other hardware and/or software applications on WCD 100. These applications may include sensors, interfaces, utilities, interpreters, data applications, etc., and may be invoked by control module 210 to read information provided by the various modules and in turn supply information to requesting modules in WCD 100.

Figure 3:
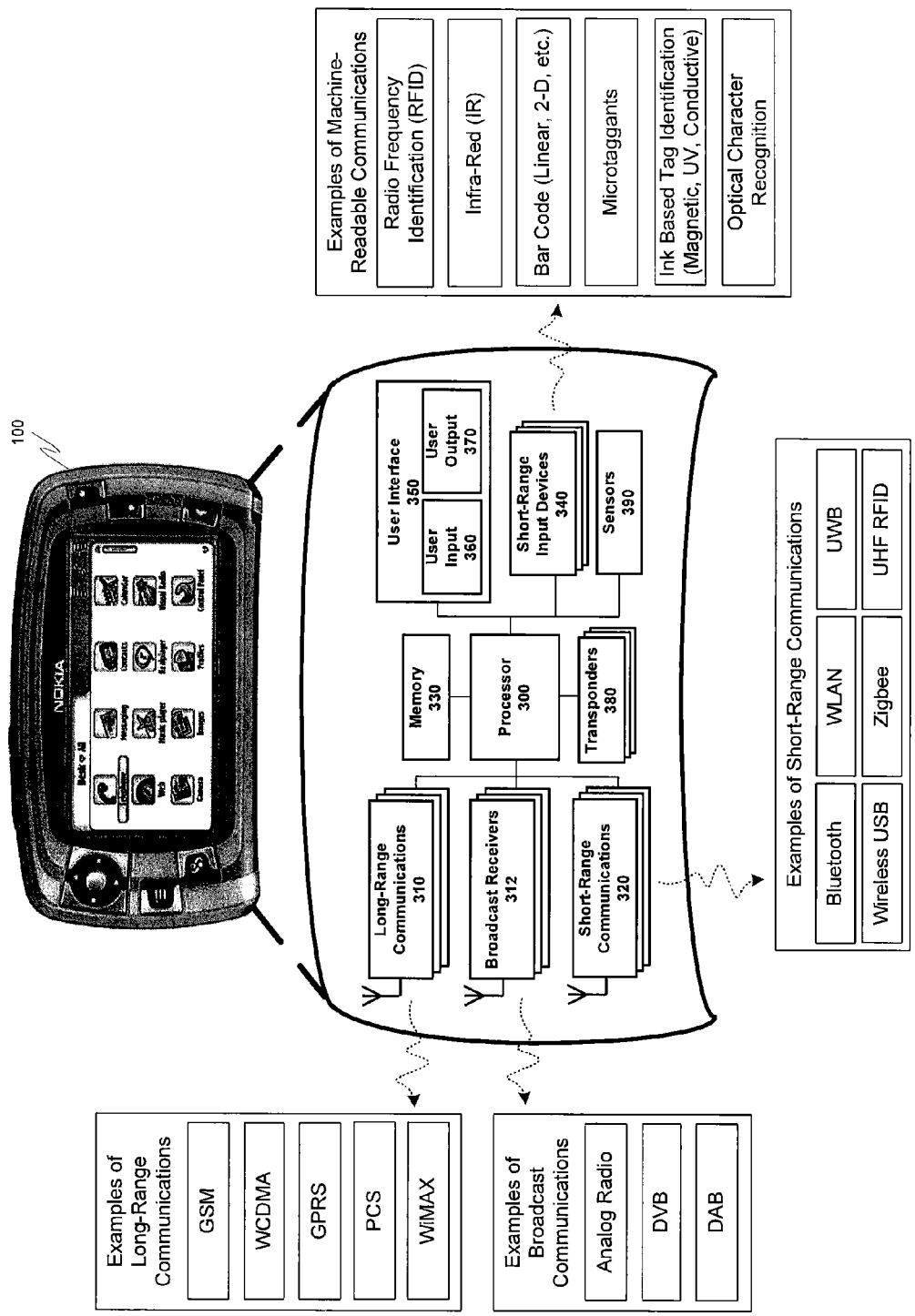
FIG. 3 discloses an exemplary structural description of the wireless communication device previously described in FIG. 2.

FIG. 3, describing at least one embodiment of the present invention, discloses an exemplary structural layout of WCD 100 according to an embodiment of the present invention that may be used to implement the functionality of the modular system previously described in FIG. 2. Processor 300 controls overall device operation. As shown in FIG. 3, processor 300 is coupled to at least communications sections 310, 320 and 340 having one or more transceivers. Processor 300 may be implemented with one or more microprocessors that are each capable of executing software instructions stored in memory 330.

Memory 330 may include random access memory (RAM), read only memory (ROM), and/or flash memory, and stores information in the form of data and software components (also referred to herein as modules). The data stored by memory 330 may be associated with particular software components. In addition, this data may be associated with databases, such as a bookmark database or a business database for scheduling, email, etc.

The software components stored by memory 330 include instructions that can be executed by processor 300. Various types of software components may be stored in memory 330. For instance, memory 330 may store software components that control the operation of communication sections 310, 320 and 340. Memory 330 may also store software components including a firewall, a service guide manager, a bookmark database, user interface manager, and any communications utilities modules required to support WCD 100.

Long-range communications 310 performs functions related to the exchange of information over large geographic areas (such as cellular networks) via an antenna. These communication methods include technologies from the previously described 1G to 3G. In addition to basic voice communications (e.g., via GSM), long-range communications 310 may operate to establish data communications sessions, such as General Packet Radio Service (GPRS) sessions and/or Universal Mobile Telecommunications System (UMTS) sessions. Also, long-range communications 310 may operate to transmit and receive messages, such as short messaging service (SMS) messages and/or multimedia messaging service (MMS) messages. Further, the wireless media specifically-identified above are presented only for the sake of explanation in the disclosure. The present invention is not limited to the aforementioned types of wireless communication media, and may be applicable to any wireless or wired communication medium.

As a subset of long-range communications 310, or alternatively operating as an independent module separately connected to processor 300, transmission receiver 312 allows WCD 100 to receive transmission messages via broadcast mediums such as Digital Video Broadcast (DVB). These transmissions may be encoded so that only certain designated receiving devices may access the transmission content, and may contain text, audio or video information. In at least one example, WCD 100 may receive these transmissions and use information contained within the transmission signal to determine if the device is permitted to view the received content.

Short-range communications 320 is responsible for functions involving the exchange of information across short-range wireless networks. As described above and depicted in FIG. 3, examples of such short-range communications 320 are not limited to Bluetooth™, WLAN, UWB and Wireless USB connections. Accordingly, short-range communications 320 performs functions related to the establishment of short-range connections, as well as processing related to the transmission and reception of information via such connections.

Short-range input device 340, also depicted in FIG. 3, may provide functionality related to the short-range scanning of machine-readable data. For example, processor 300 may control short-range input device 340 to generate RF signals for activating an RFID transponder, and may in turn control the reception of signals from an RFID transponder. Other short-range scanning methods for reading machine-readable data that may be supported by the short-range input device 340 are not limited to IR communications, linear and 2-D (e.g., QR) bar code readers (e.g., including processes related to the interpretation of Universal Product Code labels, also known as "UPC" labels), and optical character recognition devices for reading magnetic, UV, conductive or other types of coded data that may be provided in a tag using suitable ink. In order for short-range input device 340 to scan the aforementioned types of machine-readable data, the input device may include optical detectors, magnetic detectors, CCDs or other sensors known in the art for interpreting machine-readable information.

As further shown in FIG. 3, user interface 350 is also coupled to processor 300. User interface 350 facilitates the exchange of information with a user. FIG. 3 shows that user interface 350 includes a user input 360 and a user output 370. User input 360 may include one or more components that allow a user to input information. Examples of such components include keypads, touch screens, and microphones. User output 370 allows a user to receive information from the device. Thus, user output portion 370 may include various components, such as a display, light emitting diodes (LED), tactile emitters and one or more audio speakers. Exemplary displays include liquid crystal displays (LCDs), and other video displays.

WCD 100 may also include one or more transponders 380. This is a passive device that may be programmed by processor 300 with information to be delivered in response to a scan from an outside source. For example, an RFID scanner mounted in a entryway may continuously emit radio frequency waves. When a person with a device containing transponder 380 walks through the door, the transponder is energized and may respond with information identifying the device, the person, etc. Alternatively, a scanner may be mounted in the WCD so that it can read information from other transponders in the vicinity (this specific interface has been omitted from the figure in order to provide a simplified drawing).

Sensors 390, in accordance with at least one embodiment of the present invention, may also be incorporated within, or coupled to, WCD 100. Sensors 390 may give feedback to, for example, processor 300 with regard to the status or condition of WCD 100. Condition may include measured characteristics such as ambient or device temperature, amount of ambient light (e.g., light/dark sensing), changes in orientation (e.g., rotational change), motion (e.g., changes in relative or absolute position), etc. In an example scenario, wherein changes in orientation and/or motion may be utilized as input for WCD 100, these changes may be detected by components such as rotation detectors, accelerometers, acceleration transducers, G-sensors, three-dimensional (3-D) position sensors, global positioning system (GPS) receivers, relative position receivers (e.g., location with respect to an access point via wireless short-range communication), etc.

It is important to note that the scope of the functionality of an exemplary mobile device utilized in accordance with at least one embodiment of the present invention need not have all of, or could indeed add additional features to, the previously discussed components and interfaces. The mobile device previously described above is but one example of a usable device.

Hardware corresponding to communications sections 310, 312, 320 and 340 provide for the transmission and reception of signals. Accordingly, these portions may include components (e.g., electronics) that perform functions, such as modulation, demodulation, amplification, and filtering. These portions may be locally controlled, or controlled by processor 300 in accordance with software communications components stored in memory 330.

The elements shown in FIG. 3 may be constituted and coupled according to various techniques in order to produce the functionality described in FIG. 2. One such technique involves coupling separate hardware components corresponding to processor 300, communications sections 310, 312 and 320, memory 330, short-range input device 340, user interface 350, transponder 380, etc. through one or more bus interfaces (which may be wired or wireless bus interfaces). Alternatively, any and/or all of the individual components, or additional components, may be replaced by an integrated circuit in the form of a programmable logic device, gate array, ASIC, multi-chip module, etc. programmed to replicate the functions of the stand-alone devices. In addition, each of these components is coupled to a power source, such as a removable and/or rechargeable battery (not shown).

The user interface 350 may interact with a communications utilities software component, also contained in memory 330, which provides for the establishment of service sessions using long-range communications 310 and/or short-range communications 320. The communications utilities component may include various routines that allow the reception of services from remote devices according to mediums such as the Wireless Application Medium (WAP), Hypertext Markup Language (HTML) variants like Compact HTML (CHTML), etc.

III. Systems for Providing Local Scanning by Wireless Communication Devices.

Figure 4:
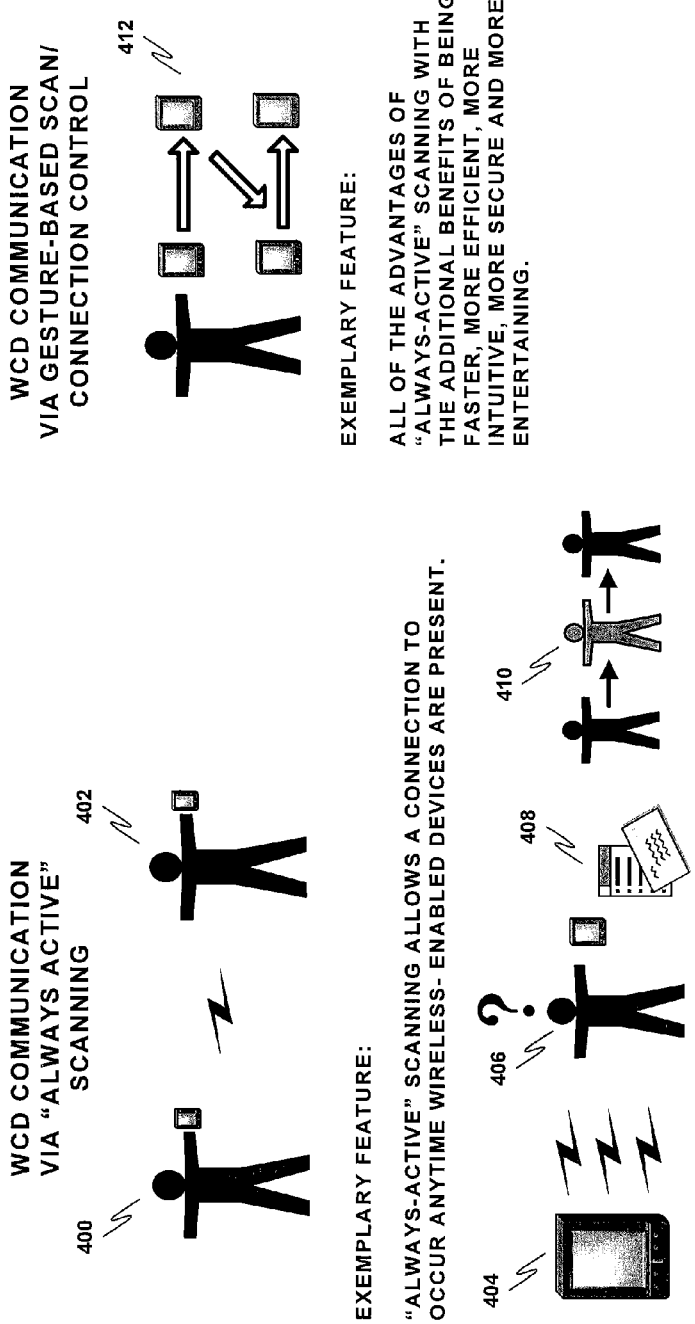
FIG. 4 discloses exemplary forms of device-finding and link establishment in accordance with at least one embodiment of the present invention.

The first example in FIG. 4, in accordance with at least one embodiment of the present invention, provides an example of at least one "always-active" scanning method for determining the presence of, pairing and/or connecting to, at least one other wireless-enabled device. Users 400 and 402 may each have WCDs, such as the previously disclosed exemplary WCD 100, for communicating via at least short-range communication. A connection between the devices may be initiated after their presence is detected via "always-active" scanning. "Always-active" scanning may provide the ability to find another user at any time another WCD is within wireless range without having to manually activate scanning.

However, there are also various disadvantages to "always-active" wireless scanning. Example WCD 404 exemplifies at least one disadvantage, wherein the power drain on a battery powering WCD 404 is accelerated. This may occur because "always-active" scanning consistently burdens various resources in WCD 404, which in turn may deprive the user of other device functionality, as well as lessen the overall duration of effective use between recharging.

Further, in most cases "always-active" scanning may still require user interaction through traditional menu interfaces to initiate a wireless connection or link with another device. This process is often cumbersome and may require a user to cease utilization of other functionality on a WCD in order to initiate a connection, then encountering all of the previously discussed as well as other disadvantages of always on scanning. Further, example user 406 demonstrates another disadvantage in the general confusion that may ensue when user 406 is presented with every wireless-enabled device within scanning range located via "always-active" scanning. In addition to possibly being confronted with many undesired devices as a user moves through different areas, the user may also have difficulty in recognizing these devices. Other devices may have names that are provided as default by the manufacturer which may include an unrecognizable string of characters. List 408, which may be accessed through a traditional menu-type interface, exemplifies the difficulty for a user in not being able to select the precise scanning range, user and/or device to which a link may be established, and therefore, to which a scan may be limited.

The users exemplified in 410 further represent a security risk that may be created by "always-active" scanning. The depicted "man-in-the-middle" attack allows a predatory WCD to emulate the signals of the true devices engaged in the wireless link and, without knowledge of the users, intercept all of the wireless messages transmitted between them. Further, not only may the "man-in-the-middle" device intercept the messages flowing between the WCDs, but these messages may also be altered with mischievous or malicious intentions. As a result, messages being exchanged between the actual participants may be invalid, corrupted, include a virus, etc. All of these potential difficulties created by "always-active" scanning may become prohibitive to a less-sophisticated user when considering whether to utilize these communication features.

In accordance with at least one embodiment of the present invention, exemplary user 412 may utilize gesture-based communication control. This type of interaction may yield at least the features disclosed with respect to "always-active" scanning, with additional benefits including being faster, more efficient, more intuitive, more secure and even more entertaining for the user. Many of these advantages may be derived from the replacement of a traditional communication system that requires menu-based control and constant scanning in an inefficient and indiscriminate manner with a system that is controlled using intuitive movements that may, in some cases, be defined by a user. These movements may be utilized to specify precise scan periods, specific users and/or devices with which communication may be desired/permitted, and ultimately, may be used to provide final approval of link establishment, data acceptance, etc.

IV: Exemplary Configurations and Strategies

Figure 5A:
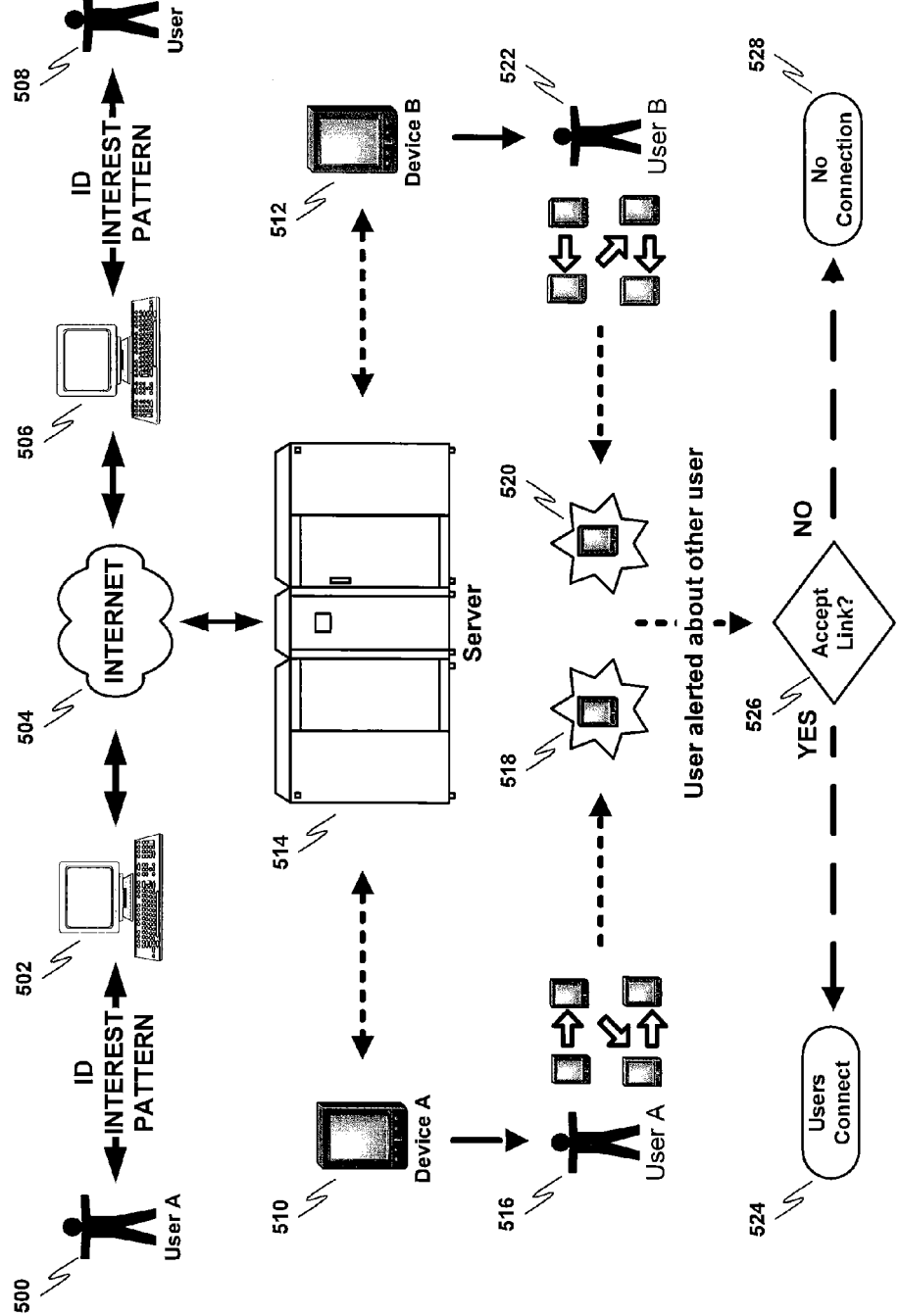
FIG. 5A discloses an exemplary communication configuration and initiation strategy in accordance with at least one embodiment of the present invention.

FIG. 5A discloses an example of users practicing gesture-based communication control in accordance with at least one embodiment of the present invention. Initially, user 500 may employ computing device 502 in order to send and receive information from Internet 504. Computing device 502 may be at least one of a desktop computer, a laptop computer, a handheld computer, a wireless communication device 100, or any other similar device enabled to access Internet 504 via a wired or wireless connection. Likewise, another user 508 may use another computing device 506 in order to connect to Internet. Computing device 506 may correspond to the same class of devices set forth with respect to computing device 502. This initial process step is not limited to the number of participants, and in some cases, may include many users.

Through the aforementioned connections to Internet 504, users 500 and 508 may electronically couple computing devices 502 and 506 to server 514. Server 514 may, for example, be configured to support or "host" an Internet web page. The subject matter of an exemplary web page may be directed to online communities of users with common interests. Such an online community may be a social community where like-minded users may create profiles for interacting with other members. In at least one embodiment of the present invention, exemplary users 500 and 508, as well as other users with similar interests, may establish personal profiles on the server for storing information such as biographical data, interests, photos, favorite artists, opinions, etc. Users 500 and 508 may also store information related to device motion and/or orientation "patterns" created, for example, using computing devices 502 or 506 on server 514, as well as other data not specifically set forth herein.

The pattern data stored on server 514 may consist, for example, of public patterns and personal patterns. Public patterns may be predetermined on server 514 before users 500 and 508 create profiles. In at least one scenario, public patterns may be established by a user who manages server 514, a webmaster, a group leader or any user who is a member of a particular user group. Personal patterns may be established by a particular user and may be stored on server 514 and/or in a WCD. For example, WCDs 510 and 512 (maintained by users 500 and 508 respectively) may couple to server 514 in order to create and/or receive profile and/or pattern information. This coupling may occur through an intermediary device, such as computing devices 502 and 506 executing a "syncing" process wherein information in the computing devices may be compared to information in the WCDs, or directly through wired or wireless communication to Internet 504. The pattern information conveyed from Server 514 may include public or personal patterns. Further, personal patterns may be configured directly on the WCDs, for example, through a motion learning process where a user moves a device in a particular fashion to teach it a pattern, during this process, orientation and/or motion sensors in WCD 510 and 512 may record the various positions of the device which are stored in order to define a pattern.

In the example of FIG. 5A, user 516 (e.g., user 500 now utilizing WCD 510) may desire to initiate scanning for other "desired" communication devices within range. A desired communication device may be, for example, WCD 512 that belongs to user 508 also registered in server 514 (e.g., with a profile) as part of the same user group as user 516. To initiate scanning, user 516 may perform a combination of motion and/or orientation changes with WCD 510 in order to replicate a pattern recognizable to WCD 510. Performing a predetermined pattern may trigger WCD 510 to execute an event, such as the activation of wireless scanning for other users/devices in the same user group as user 516. If other users are present and discoverable, such as in the case wherein user 522 (e.g., user 508 with WCD 512) has performed a combination of orientation and or position changes to form a pattern recognized as a trigger for allowing activation of scanning or wireless communication inquires from other users in the same user group as user 522, then both users may be alerted on via their WCD as shown at 518 and 520, respectively.

The alert implemented by devices 518 and 520 in FIG. 5A may include a vibrating alert, a visual alert, an audio alert or any combination of these or other methods for alerting WCD users. Users 516 and 522 may be alerted as shown at 518 and 520 respectively. Further, the respective alerts may contain information about the other party initiating or receiving communication. This information may include the group name of the other user and/or personal identification information. Once alerted at 540 and 540, the users (e.g., 516 and 520) may receive group and/or identification information, and each may choose to perform the same or another predetermined set of orientation and/or position changes recognized as a pattern by WCD 510 and 512 to initiate a pairing process between the devices and further communication between the devices. Decision 526 exemplifies that either user 516 or 522 may elect to pursue or deny a connection. Users 516 and 522 may also have predetermined responses configured in their WCD to automatically respond to the proposed connection. For example, the predetermined response may deny a connection (e.g., 528) if the inquiry is from a particular person, a member of a particular group, at a certain time, in a certain location, etc. However, if both users desire to communicate, then a connection may be established at 524. After a connection is established, other events may occur including the playing of a particular audio sequence, the initialization of a game between user 516 and 522, the initialization of a request to transfer information between the various users, etc. As alluded to previously, these actions may be designed to enhance social interaction between various members of a user group.

FIG. 5B discloses an alternative communication configuration and/or strategy in accordance with at least one embodiment of the present invention. User 530 may connect to server 536 using a wired or wireless computing device 532 coupled to Internet 534. This may, for example, be accomplished in a manner similar to the process described in FIG. 5A. In this scenario user 538 (e.g., user 530 manipulating a WCD) may perform a series of orientation and or position changes with the device to trigger a scan mode. However, this scanning process may further include an initial interaction between the WCD and server 536 in order to receive updated information on potential "targets" within range of the WCD. This step may be beneficial in the case where a user group includes a community of users/devices that is so large that is cannot all be stored in the memory of a WCD. In this way, a more-manageable subset of the entire user group information may be obtained by the WCD, wherein this subset of the entire user group information may be defined by a certain location, a certain day, a certain time, a particular commonality, etc. Further, the information exchanged between a WCD and server 536 may be conveyed via any long-range or short-range wireless communication medium that supports data transfer, for example, GPRS, Bluetooth™, WLAN, Wibree™ etc.

Once the listing of users/devices has been updated in the WCD of user 538, scanning may commence any matches in range. As shown at 536 in FIG. 5B, in this exemplary configuration of the present invention, it is possible that server 536 may return a notification that no other user/devices match the current criteria of user 538, and therefore, no potential "target" information will be returned. User 538 may then determine to continue updating and scanning in order to locate potential user group participants with common interests. This continuance may be triggered, for example, by user 538 repeating the pattern to initiate scanning. Alternatively, if user 538 does not want to continue the scanning process, than another terminating pattern or other event (e.g., a process timeout) may occur in order to terminate the scanning process.

Otherwise, the process may continue in a manner such as explained with respect to FIG. 5A. In this example, in the case of a potential connection the various user devices may alert at 540 at 542. These alerts may be vibratory, audio and/or visual, and may include audio or visual cues indicating to all parties that a connection to a user or device in a particular user group is available. The invitation to pair and/or communicate may be accepted or denied via the performance of a personal or public pattern that may be recognized by a WCD, or may be automatically accepted or denied in accordance with rules or filters configured on a device. The acceptance of a proposed connection may further lead to the triggering of an entertainment software application such as a game, a media player, a particular user interface for communicating with another user such as a texting window, the exchanging of personal information, the exchanging of downloadable files, etc.

FIG. 6, in accordance with at least one embodiment of the present invention, discloses two examples of possible patterns recognizable by a WCD. As previously set forth, these patterns may be defined publicly (e.g., for use by an entire user group) or as a personal pattern for user by a single user. Public patterns may be used, for example, to identify a user as being a member of a particular user group. This use may be deemed as being analogous to a password or "secret handshake" where only members of a particular group would be aware of the motion. There may also be public patterns defined at the group level for voting (e.g., a "yes" motion and a "no" motion), for representing a group interest (e.g., a "fishing rod" motion representing an invitation to go fishing), motions associated with playing games, etc. Personal patterns may be used for actions specific to one user. For example, a user may have a motion to initiate scanning or pairing, or to accept communication from another user in a particular user group. As shown, user 600 may move a WCD in a "Z" pattern. The motion sensing aspect may be automatic (e.g., as in a set mode) or may be manually activated, such as by holding a button on the WCD during the motion. The device may then rely upon imbedded motion, acceleration and/or position sensors (e.g., a global positioning system, or GPS, transponder) to follow the motions and then compile these motions into a pattern. Once the pattern is recognized, an event may be triggered. For example, a wireless scanning function 602 may activate upon successful completion of a "Z" pattern, followed by a possible pairing process and/or connection initialization such as set forth above upon completion of the same or a different pattern.

Orientation may also be used as a part of a pattern. Orientation changes may be easier to conceal by a user, and therefore, may confound a "predator" attempting to observe a particular pattern. User 604 in FIG. 6 may change the orientation of their device from front to back to perform a "flipping" motion. In total, the motion disclosed at 604 may utilize both directional and orientation sensors to form a more intricate pattern. It is important to note that the disclosed "flipping" motion is but one example of a possible orientation change which user 604 may perform with their device. As set forth in the previous example, a scan mode 606 may initiate upon the successful completion and recognition of the exemplary pattern including both a "flipping" orientation change and a lateral motion (e.g., a position change) by user 604.

Now referring to FIG. 7A that discloses one embodiment of the present invention, an exemplary scenario in which users may demonstrate their membership in a particular user group and/or confirm their interest in accepting a pairing request and/or a link from an initiating user's WCD through the execution of predetermined patterns is now disclosed. User 700 may initiate wireless scanning at 702 by performing an exemplary "Z" pattern as shown. The scanning performed by the WCD may include any combination of short-range and/or long-range wireless scanning. At 704 the wireless scan may locate another device that is a member of the desired user group defined by the exemplary "Z" pattern within range of user 700. Upon determining that the other user is a member of the desired group, both users may be alerted at 706 about the possible link.

As previously set forth, alerts may include vibration, visual and audio alerts, or any combination thereof. These alerts may include an audio or visual indication of the action requested by the initiator to the "target" user. For example, an alert may be accompanied by indicia of a particular user group, including a picture and or accompanying sound. This information may further include the nature of the requested connection. For example, the connection may be requested to chat socially between group members, to discuss or debate current events topics, to play a game, to exchange video and/or audio files, etc.

A decision may then be made at 708 at to whether user 710 desires to engage in the proposed communication with user 700. If the proposed connection is desired, user 710 may perform a predetermined pattern of orientation and/or position changes that may be recognized as an acceptance of the proposed pairing and/or link establishment with user 700. A successful completion and recognition of the acceptance pattern by user 710 may then result in a connection at 712. Further, user 700 may also perform the same predetermined pattern of orientation and/or position changes in order to trigger a further pairing and/or connection activity in the user device after the initial scanning and successful recognition or acknowledgement of the user 710.

However, either user 700 or 710 may also manually or automatically determine not to establish a connection. This may occur due to automatic controls established in a WCD based on location, day/time, the proposing user, group affiliation, etc. A denial may also occur when either user performs an orientation and/or movement pattern that is a recognized as a denial of pairing, connection and/or possibly a termination of active communication mode. Should either user determine they are not interested in establishing a connection end process may result at 712.

FIG. 7B, in accordance with at least one embodiment of the present invention, discloses an exemplary scenario of what may occur after at least two devices are paired, a connection is requested, and then successfully established, between two or more devices. In at least one scenario, the connection may be established between the devices using a short-range wireless communication medium such as previously disclosed. For example, in the case of a social networking scenario, user information, such as user information from each of the disclosed users 714 and 718 may be exchanged between devices 716 and 720, respectively. As a result, the type of information that user 714 may view on their device 716 may include, but is not limited to, personal information, images, preferred activities, current location, and/or other types of information about user 718. Likewise, user 718 may use device 720 to view similar information with respect to user 714.

FIG. 8, describing at least one embodiment of the present invention, discloses another exemplary scenario in which user 800 may utilize gesture-based control of their WCD to connect with a device that is a point of interest (POI). In accordance with previous examples, user 800 may execute a predetermined orientation and/or motion pattern to initiate scanning at 802. Scanning 802 may then discover any number of POIs in range of user 800's WCD. A POI may be, for example, an automated access point supporting short-range wireless communication. Exemplary locations for POIs may include, but are not limited to, stores, restaurants, public venues, historical sites, service oriented business, etc. POIs may be affiliated with certain interests and/or preferences, and therefore, certain user groups of which user 800 may be a member. The matching of a POI to user 800 based upon the possible a pre-established category may happen through information stored on a WCD or through a server.

The discovery of a POI in accordance with the search parameters of user 804 may lead to user 800 being prompted at 806 as to whether to connect to the POI. If no connection is desired then the process may end at 812, for example, upon a specified termination gesture. Otherwise, one exemplary visual prompt to user 800 is exemplified by device 808. The display of device 808 exemplifies a list of relevant POI devices to which user 800 may want to connect. User 800 may make a selection and pairing of a POI by using the same or another orientation and/or movement pattern, or alternatively, may simply utilize interfaces on WCD 808 to make a selection. The additional information that user 800 may receive upon actual connection to a POI may include, but is not limited to, hours of operation, menus, prices, background information, membership information, coupons, etc. In this example, a user may receive the hours of operation and menu information for a particular restaurant.

FIG. 9A discloses an exemplary process flowchart, in accordance with at least one embodiment of the present invention, for the entry of data via the Internet onto a database in a server. This entry may be performed by any user having the ability to connect to the database. Beginning process 900 represents this input of information into the database. This input may initiate simply by a user utilizing a computing device connected to the internet to access a webpage. Once at the webpage, the user may be prompted to create a personal profile. The affiliation of a user to a group may be selected manually by the user, or alternatively, may be determined automatically with respect to personal data entered in the user's profile. The type of data that may be entered by a user in a profile may include, but is not limited to, biographical data, images, preferences, the predetermined motion to be performed by the user's WCD, etc.

As previously set forth, pattern definition data may be public or personal. Further, public patterns may be defined at the group level, while personal patterns may be defined at the user level. In step 904, data may be transferred to and from the database to a wireless-enabled device (WCD). This information may include profile information, group information and pattern information. Pattern information may include public patterns, user group specific patterns and personal patterns. Further, personal patterns may be defined by a user on a WCD through a learning process, wherein a user starts a recording application and then performs a pattern, the changes in orientation and motion of the device being recorded and stored as a personal pattern.

Step 906 then exemplifies the manner in which a user may activate scanning in a WCD by performing a set of orientation changes and/or motions. If correctly executed, a WCD may recognize the sequence of actions and trigger an event in the WCD. For example, a predetermined set of orientation changes and/or motions may be recognized by the WCD as a predetermined pattern for triggering a scanning and/or pairing process for user devices corresponding to a user group.

Figure 9B:
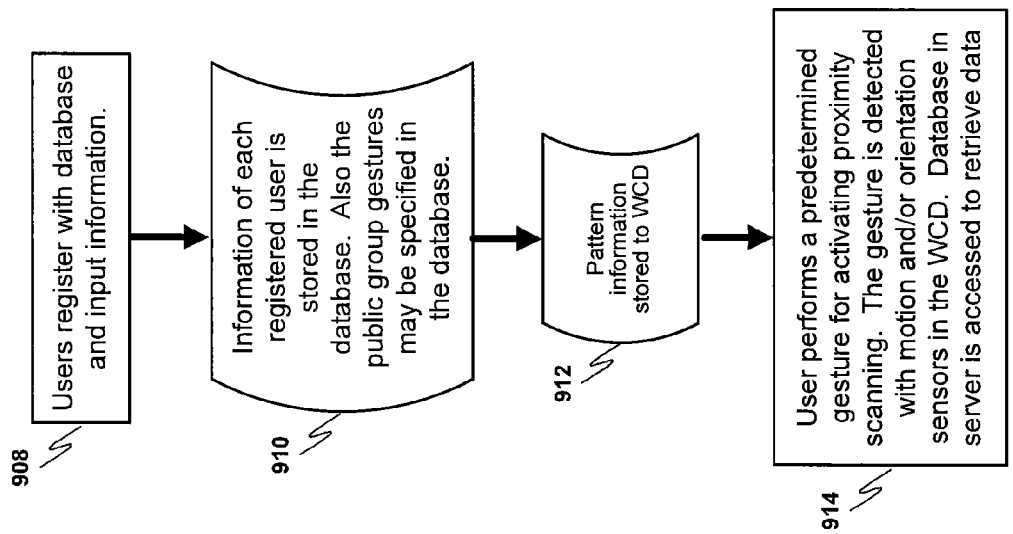
FIG. 9B discloses an exemplary flowchart for a process of storing and accessing information from a server in accordance with at least one embodiment of the present invention.

FIG. 9B, in accordance with at least one embodiment of the present invention, discloses a similar process to FIG. 9A, except that in this exemplary process flow a WCD may access a server when scanning is activated. In step 908 a user may connect to a database (e.g., through a webpage on the Internet) and create a profile. This profile may contain information about the user that may be used to categorize the user as a member of a particular user group. In step 910 this information is stored to the database, which may include public patterns defined at the group level by user group members, the owner and/or the editor of the server and/or webpage. Further information may be stored with regard to personal patterns.

Pattern information may be stored to the WCD in step 912. A limited amount of information may be stored, for example, because the user group information is too large to store on the WCD. As a result, in step 914 when a pattern is performed in order to enabled scanning or pairing in the WCD, a step may also occur when this pattern is recognized by the WCD wherein the device again engages in contact with the server in order to obtain a subset of the user group information applicable to the current environment of the WCD. For example, this subset may be delineated by the day/time, the location of the WCD, a particular subject matter by which a connection may be limited, a particular activity to be performed, etc. Once the subset of information is defined, either the subset may be sent to the WCD to perpetuate searching for a matching user/device, or the server may make a determination as to which devices are in the area and may accept connection. This second option may require that the WCD, as well as any other active user group devices, periodically update current location/status information in the database.

Figure 10A:
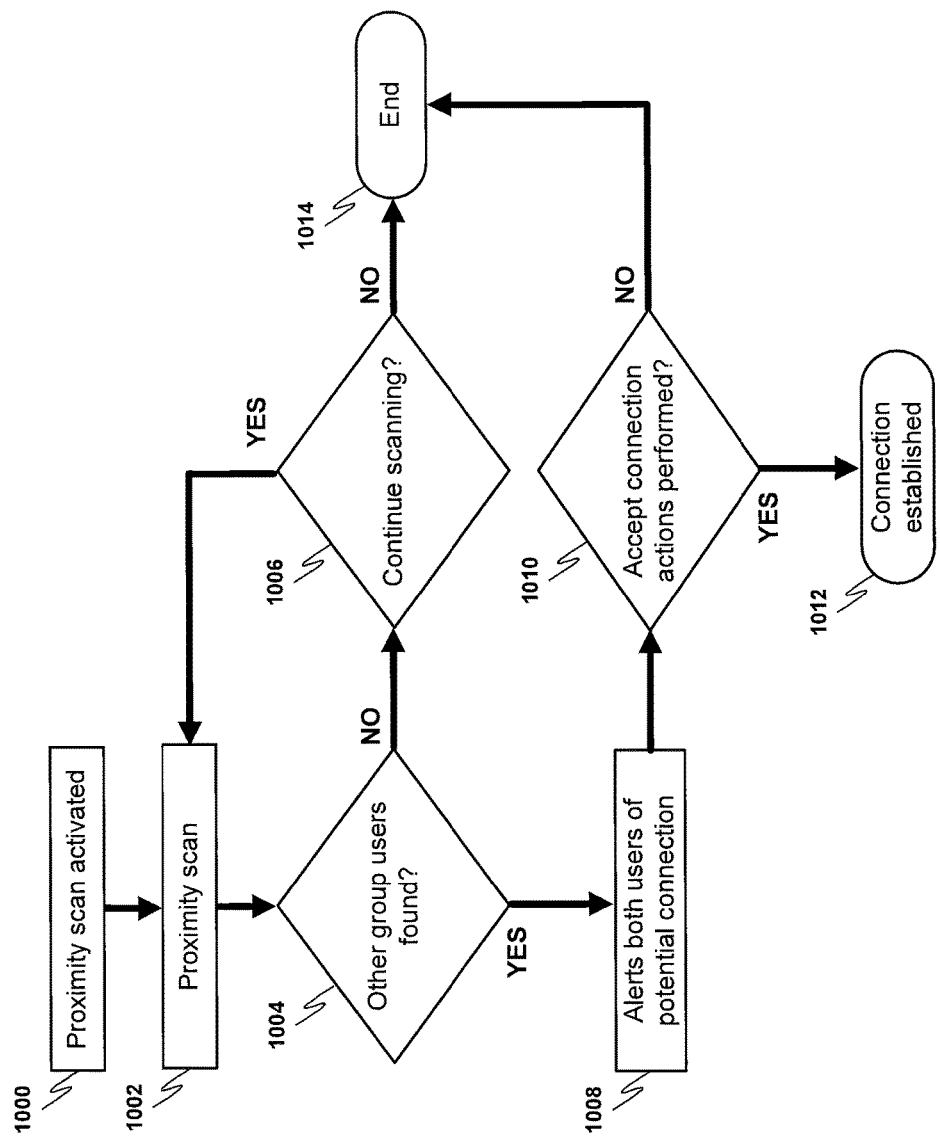
FIG. 10A discloses an exemplary flowchart for a location and discovery process for another user device in accordance with at least one embodiment of the present invention.

In accordance with at least one embodiment of the present invention, FIG. 10A discloses the manner in which a user may activate scanning through performing a predetermined motion with the WCD, as well as possibly establishing pairings and/or connections with one or more other users. Step 1000 exemplifies how a user may initiate scanning by performing a predetermined pattern of orientation changes and/or motion with their WCD. Once the pattern is recognized and the scan is triggered, then in step 1002 the scan may execute and continue until step 1004. In step 1004 a determination is made as to whether a user/device from the particular user group being sought has been found. If no device has been found then an inquiry made be made in step 1006 as to whether scanning may continue. If, for example, the user no longer wishes to seek out other users/devices, then the process may end in step 1014. This may occur due to a timeout elapsing, or alternatively, in response to a termination pattern or key press performed by the user.

If the device does continue to scan, then from step 1006 the process may return to scanning step 1002 until another device is located in step 1004. When another device is located, then in step 1008 an alert, in accordance with previous alert examples, may occur on one or both devices. In step 1010 a determination is made as to whether both devices accept the pairing and/or connection upon pattern recognition. If both devices accept the invitation to pair and/or connect, then in step 1012 a connection may be established. Alternatively, if any of the devices involved in the connection decline, then the process may end in step 1014. Further, while not shown in FIG. 10A, the failure of the devices to form a connection may also restart scanning to look for another device, if desired by the user.

FIG. 10B, describing at least one embodiment of the present invention, discloses an exemplary process flow similar to FIG. 10A but now applicable to the connection of a point of interest, or POI, to a WCD. Again, in step 1016 a proximity scan may be activated in order to located another device that is a member of a desired user group. This scan may be activated, for example, through the recognition of a pattern performed by the user of the WCD. However, in this example the scan being executed in step 1018 is searching for a POI relevant to a particular user group rather than another user/device.

If no POI (e.g., an automated short-range access point) is scanned by the WCD, then in step 1022 an inquiry occurs as to whether scan should continue. If scanning should cease, then in step 1030 the process may terminate. Otherwise the scanning may continue by step 1022 then returning to step 1018. When a POI is located in step 1020, then in step 1024 the user is alerted, in accordance with previous examples, that a POI in the correct category has been located. If both the user (e.g., via a gesture) and POI accept pairing and/or connection in step 1026, then a pairing and/or connection may be established in step 1028. A POI may decline connection in such cases wherein the POI already is serving the maximum number of client or wherein there is some functional problem with the device. If the POI does decline the connection, then the process may terminate in step 1030. As set forth above, though not shown in FIG. 10B, the process may also reactivate and begin a new POI scan.

Accordingly, it will be apparent to persons skilled in the relevant art that various changes in forma and detail can be made therein without departing from the spirit and scope of the invention. The breadth and scope of the present invention should not be limited by any of the above-described exemplary embodiments, but should be defined only in accordance with the following claims and their equivalents.

What is claimed:

1. A method, comprising:
    receiving user group information in a wireless communication device, the user group information comprising movement pattern information, the movement pattern information being related to at least one user group;
    storing the movement pattern information in the wireless communication device, the wireless communication device including one or more movement sensors;
    receiving sensor information from the one or more movement sensors;
    comparing the sensor information to the movement pattern information; and
    triggering a predetermined event associated with establishing or denying communications between another wireless communication device of the at least one user group and the wireless communication device based on whether the sensor information is associated with the movement pattern information.

2. The method of claim 1 wherein the user group information further comprises information related to at least one user profile.

3. The method of claim 2, wherein the at least one user profile includes at least information related to users that are members of one or more user groups.

4. The method of claim 2, wherein the at least one user profile includes at least one of personal user information, user interest information, user photographic information and information related to at least one personal movement pattern.

5. The method of claim 1, wherein the movement pattern information includes one or more of wireless communication device movements related to a device orientation, a device position, or a combination thereof.

6. The method of claim 1, wherein the movement pattern information includes movement patterns defined by at least one of a user group member, a database owner, a website owner, and a server owner.

7. The method of claim 1, wherein the movement pattern information includes movement patterns defined by specifying movement patterns in a server, recording the sensor information in the wireless communication device, or a combination thereof.

8. The method of claim 1, wherein comparing the sensor information to the movement pattern information includes executing a movement pattern by altering an orientation, a position, or a combination thereof of the wireless communication device, which is then compared to movement patterns stored as movement pattern information on the wireless communication device.

9. The method of claim 1, wherein the triggering of the predetermined event in the wireless communication device includes activating a wireless scan, requesting a wireless connection, accepting a request for a wireless connection, denying a request for a wireless connection, accepting a request to transfer data to the another wireless communication device, or a combination thereof.

10. The method of claim 9, wherein activating a wireless scan includes establishing a wireless connection from the wireless communication device to a central database, and receiving updated group information from the central database.

11. The method of claim 1, further comprising receiving acknowledgement information from a second wireless communication device.

12. The method of claim 11, wherein triggering the predetermined event in the wireless communication device includes requesting and establishing a paired relationship between the wireless communication device and the second communication device.

13. A non-transitory computer-readable storage medium carrying one or more sequences of one or more instructions which, when executed by one or more processors, cause an apparatus to perform at least the following:
receiving user group information in a wireless communication device, the user group information comprising movement pattern information, the movement pattern information being related to at least one user group;
storing the movement pattern information in the wireless communication device, the wireless communication device including one or more movement sensors;
receiving sensor information from the one or more movement sensors;
comparing the sensor information to the movement pattern information; and
triggering a predetermined event associated with establishing or denying communications between another wireless communication device of the at least one user group and the wireless communication device based on whether the sensor information is associated with the movement pattern information.

14. The non-transitory computer-readable storage medium of claim 13, wherein the user group information further comprises information related to at least one user profile.

15. The non-transitory computer-readable storage medium of claim 14, wherein the at least one user profile includes at least information related to users that are members of one or more user groups.

16. The non-transitory computer-readable storage medium of claim 14, wherein the at least one user profile includes at least one of personal user information, user interest information, user photographic information and information related to at least one personal movement pattern.

17. The non-transitory computer-readable storage medium of claim 13, wherein movement pattern information includes one or more of wireless communication device movements related to a device orientation, a device position, or a combination thereof.

18. The non-transitory computer-readable storage medium of claim 13, wherein the movement pattern information includes movement patterns defined by at least one of a user group member, a database owner, a web site owner, and a server owner.

19. The non-transitory computer-readable storage medium of claim 13, wherein the movement pattern information includes movement patterns defined by specifying movement patterns in a server, recording the sensor information in the wireless communication device, or a combination thereof.

20. The non-transitory computer-readable storage medium of claim 13, wherein comparing the sensor information to the movement pattern information includes executing a movement pattern by altering an orientation, a position, or a combination thereof of the wireless communication device, which is then compared to movement patterns stored as movement pattern information on the wireless communication device.

21. The non-transitory computer-readable storage medium of claim 13, wherein the triggering of the predetermined event in the wireless communication device includes activating a wireless scan, requesting a wireless connection, accepting a request for a wireless connection, denying a request for a wireless connection, accepting a request to transfer data to the another wireless communication device, or a combination thereof.

22. The non-transitory computer-readable storage medium of claim 21, wherein activating a wireless scan includes establishing a wireless connection from the wireless communication device to a central database, and receiving updated group information from the central database.

23. The non-transitory computer-readable storage medium of claim 13, wherein the apparatus is caused to further perform:
receiving acknowledgement information from a second wireless communication device.

24. The non-transitory computer-readable storage medium of claim 23, wherein triggering the predetermined event in the wireless communication device includes requesting and establishing a paired relationship between the wireless communication device and the second communication device.

25. A wireless communication device, comprising:
- one or more sensors;
- one or more wireless communication modules; and
- a processor coupled to at least the one or more sensors and the one or more wireless communication modules, the processor further being configured to:
  - receive user group information in the wireless communication device, the user group information comprising movement pattern information, the movement pattern information being related to at least one user group;
  - store the movement pattern information, the wireless communication device including one or more movement sensors;
  - receive sensor information from the one or more movement sensors;
  - compare the sensor information to the movement pattern information; and
  - trigger a predetermined event associated with establishing or denying communications between another wireless communication device of the at least one user group and the wireless communication device based on whether the sensor information is associated with the movement pattern information.

26. The wireless communication device of claim 25, wherein the sensors sense changes in a device orientation, a device position, or a combination thereof.

27. The wireless communication device of claim 25, further comprising at least one memory for storing the user group information.

28. The wireless communication device of claim 25, further comprising an interface module configured to alert a device user, the interface module communicating via at least one of audio, visual or tactile communication.

29. A system, comprising:
- a server; and
- a wireless communication device configured to receive user group information from the server, wherein the user group information comprises movement pattern information, the movement pattern information being related to at least one user group;
- the wireless communication device further configured to store the movement pattern information, the wireless communication device including one or more movement sensors;
- the wireless communication device further configured to receive sensor information from the one or more movement sensors;
- the wireless communication device further configured to compare the sensor information to the movement pattern information; and
- the wireless communication device further configured to trigger a predetermined event associated with establishing or denying communications between another wireless communication device of the at least one user group and the wireless communication device based on whether the sensor information is associated with the movement pattern information.

* * * * *